US012732016B2

(12) United States Patent
Kim et al.

(10) Patent No.: US 12,732,016 B2
(45) **Date of Patent: *Sep. 8, 2026**

(54) SYSTEM AND METHOD FOR TRANSITIONING TO BACKUP POWER POOLING

(71) Applicant: Google LLC, Mountain View, CA (US)

(72) Inventors: Sangsun Kim, San Jose, CA (US); Krishnanjan Gubba Ravikumar, Ashburn, VA (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/795,379

(22) Filed: Aug. 6, 2024

(65) Prior Publication Data

US 2024/0396367 A1 Nov. 28, 2024

Related U.S. Application Data

(63) Continuation of application No. 17/987,081, filed on Nov. 15, 2022, now Pat. No. 12,081,064.

(51) Int. Cl.
*H02J 3/00* (2026.01)
*H02J 3/0012* (2026.01)
(Continued)

(52) U.S. Cl.
CPC ............ *H02J 9/062* (2013.01); *H02J 3/0012* (2020.01); *H02J 3/32* (2013.01); *H02J 3/381* (2013.01); *H02J 3/388* (2020.01); *H02J 2101/20* (2026.01)

(58) Field of Classification Search
CPC .. H02J 2300/00; H02J 2300/20; H02J 3/0012; H02J 3/32; H02J 3/381;
(Continued)

(56) References Cited

U.S. PATENT DOCUMENTS 9,923,371 B1 3/2018 Emert et al.
2004/0262997 A1* 12/2004 Gull .......................... H02J 9/08 307/64
(Continued)

FOREIGN PATENT DOCUMENTS

EP 2980959 A1 2/2016

OTHER PUBLICATIONS

Extended European Search Report for European Patent Application No. 23174210.7 dated May 29, 2024. 7 pages.

*Primary Examiner* — William Hernandez
(74) *Attorney, Agent, or Firm* — Lerner David LLP

(57) ABSTRACT

A system and method for power pooling, the system including a shared power line, a plurality of backup power supplies connected to the shared power line through respective transformers and one or more controllers configured to, for each respective backup power supply, after passage of a different respective predetermined amount of time, determine whether a transformer connected to the backup power supply is energized. In response to the transformer being energized, the controllers synchronize the backup power supply with the transformer and then set a switch positioned between the backup power supply and the transformer to a fully closed state. In response to the transformer not being energized, the controllers transition the switch from a fully open state to the fully closed state according to an inrush current limiting scheme.

23 Claims, 5 Drawing Sheets

(51) Int. Cl.

| | |
|---|---|
| ***H02J 3/32*** | (2006.01) |
| ***H02J 3/38*** | (2006.01) |
| ***H02J 3/388*** | (2026.01) |
| ***H02J 9/06*** | (2006.01) |
| *H02J 101/20* | (2026.01) |

(58) Field of Classification Search

CPC ...... H02J 3/388; H02J 9/04; H02J 9/06; H02J 9/061; H02J 9/062

USPC ......... 307/43, 64, 65, 69, 71, 80, 83, 85, 86

See application file for complete search history.

(56) References Cited

U.S. PATENT DOCUMENTS

| | | | | |
|---|---|---|---|---|
| 2012/0205982 | A1 | 8/2012 | Navarro et al. | |
| 2012/0212051 | A1* | 8/2012 | Heidenreich | H02J 9/062 307/23 |
| 2012/0248897 | A1 | 10/2012 | Savolainen et al. | |
| 2013/0270912 | A1 | 10/2013 | Krenz | |
| 2014/0209415 | A1 | 7/2014 | Hall | |
| 2017/0085121 | A1 | 3/2017 | Cairoli et al. | |
| 2018/0076658 | A1 | 3/2018 | Mannuccini et al. | |
| 2018/0076659 | A1 | 3/2018 | Giuntini et al. | |
| 2019/0115175 | A1* | 4/2019 | Saito | H02J 9/061 |
| 2019/0341804 | A1* | 11/2019 | Coleman | H02J 9/06 |
| 2022/0102966 | A1* | 3/2022 | Tan | G01R 31/006 |
| 2023/0198289 | A1* | 6/2023 | Matsumoto | H02J 9/068 |

* cited by examiner

200

500

SYSTEM AND METHOD FOR TRANSITIONING TO BACKUP POWER POOLING

CROSS-REFERENCE TO RELATED APPLICATION

The present application is a continuation of U.S. patent application Ser. No. 17/987,081, filed Nov. 15, 2022, the disclosure of which is hereby incorporated herein by reference.

BACKGROUND

A group of loads that consume large amounts of power, such as a group of servers and storage systems in a data center, is typically connected to a power grid. The group of loads may further connect to a backup power system to maintain operation in the event of a power grid failure. The backup power system may include a plurality of backup power sources, each source connected to a respective load of the group of loads, and capable of generating sufficient power to maintain the operation of its respective load.

In order to reduce the expense of providing backup power sources, the backup power sources may be pooled with one another so that utilization of the backup power system is maximized. In order to pool back power sources, it is necessary to connect the backup power sources with one another. However, the separate backup power sources may be unsynchronized, which prevents the power sources from being connected to one another. Furthermore, connecting the backup power sources simultaneously can result in an inrush current that is harmful to the switching circuitry that connects the backup power sources.

BRIEF SUMMARY

The present disclosure provides backup power systems and methods of operation that transitions the backup power system from individual backup power sources powering respective loads to a power pooling configuration in which the individual backup power sources are connected to one another so that any load of the system may be powered by any one or combination of the backup power sources. The systems and methods avoid difficulties due to synchronization and inrush current by staggering the connection of the individual backup power sources over a predetermined amount of time.

In one aspect of the present disclosure, a method for supplying backup power after failure of a primary power source includes: controlling, by one or more controllers, a first switch to disconnect a first backup power supply from a first transformer and a second switch to disconnect a second backup power supply from a second transformer, wherein the first transformer connects the first backup power supply to a shared power line and wherein the second transformer connects the second backup power supply to the shared power line; and controlling, by the one or more controllers, the first backup power supply to supply power to a first load and the second backup power supply to supply power to a second load; at a predetermined first time after the first backup power supply begins supplying power to a first load and the second backup power supply begins supplying power to a second load, controlling, by the one or more controllers, the first switch to reconnect the first backup power supply to the first transformer; and at a predetermined second time later than the first time, controlling, by the one or more controllers, the second switch to reconnect the second backup power supply to the second transformer.

In some examples, controlling the first switch to reconnect the first backup power supply to the first transformer may include gradually adjusting a firing angle applied to the first switch until the firing angle is 0°.

In some examples, gradually adjusting a firing angle applied to the first switch may include setting the firing angle to an initial value close to 180° at the predetermined first time, and setting the firing angle to 0° before the predetermined second time.

In some examples, controlling the second switch to reconnect the second backup power supply to the second transformer may include determining whether the second transformer is energized by power received from the first backup power supply over the shared power line, in response to the second transformer not being energized, at the predetermined second time, gradually adjusting the firing angle applied to the second switch until the firing angle is 0°, and in response to the second transformer being energized, synchronizing the second backup power supply with the second transformer and reconnecting the synchronized second backup power supply to the second transformer.

In some examples, the method may further include controlling, by the one or more controllers, an islanding switch to disconnect the shared power line from the primary power source prior to connection of the first backup power supply to the first transformer.

In some examples, the predetermined first time and the predetermined second time may be about ten seconds apart.

In some examples, the shared power line may be connected to one or more additional backup power sources, and the method may further include controlling, by the one or more controllers, respective switches of each of the additional backup power supplies to connect the additional backup power supplies to the shared power line at respective predetermined times, wherein each respective predetermined time is a different time and is different from the predetermined first and second times.

In some examples, for each respective switch of the additional backup power supplies, controlling the respective switch may include determining whether a respective transformer connected to the respective switch is energized by power received over the shared power line, in response to the respective transformer not being energized, at a predetermined respective time, gradually adjusting the firing angle applied to the respective switch until the firing angle is 0°, and in response to the respective transformer being energized, synchronizing the respective backup power supply connected to the respective switch with the respective transformer, and reconnecting the synchronized respective backup power supply to the respective transformer.

In some examples, the method may further include controlling, by the one or more controllers, the first backup power supply to supply power to the first load at a first power rating prior to the predetermined first time, and controlling, by the one or more controllers, the first backup power supply to supply power to the shared power line at a second power rating after the predetermined second time, wherein the second power rating is lower than the first power rating.

In some examples, supplying power to the first load at a first power rating may include supplying power from each of a first power source and a second power source, supplying power to the first load at a second power rating may include supplying power from only the first power source, the first power source may include a renewable energy source, and the second power source may include one or more batteries.

Another aspect of the disclosure is directed to a system including: a shared power line; a plurality of transformers, each transformer connected to the shared power line; a plurality of backup power supplies, each backup power supply connected to the shared power line through a respective transformer; and one or more controllers configured to, for each respective backup power supply of the plurality of backup power supplies: after passage of a respective predetermined amount of time, determine whether a respective transformer connected to the respective backup power supply is energized, wherein the respective predetermined amount of time is different from each of plurality of backup power supplies; in response to the respective transformer being energized: synchronize the backup power supply with the respective transformer; and upon synchronization of the respective backup power supply with the respective transformer, set a respective switch positioned between the respective backup power supply and the respective transformer to a fully closed state; and in response to the respective transformer not being energized, transition the respective switch from a fully open state to the fully closed state according to an inrush current limiting scheme.

In some examples, each respective backup power supply may be an uninterruptable power supply configured to power a respective load in response to failure of a primary power source, and the respective load powered by the respective backup power supply may include one or more electrical components of a datacenter.

In some examples, each uninterruptable power supply may include a first renewable power source and a second power source, and the uninterruptable power supply may be configured to supply power to the respective load at a first power rating using the first and second power sources and at a second power rating using only the first power source.

In some examples, each respective power source may include a respective renewable power source and a respective battery configured to supplement power supplied by the renewable power source, and a run time of the battery may be greater than or equal to a longest predetermined amount of time of the respective predetermined amounts of time.

In some examples, the respective renewable power source may include at least one of a hydrogen fuel cell, a biofuel cell, or a solar cell.

In some examples, a difference between the first power rate and the second power rate may correspond to an over-subscription ratio of the datacenter.

In some examples, the one or more controllers may be configured to, in response to detection of the failure of the primary power source: control each of the respective switches to disconnect the plurality of backup power supplies from the shared power line; and for each respective backup power supply, control activation of a respective inverter connected to the respective backup power supply and configured to convert direct current power of the respective backup power supply into alternating current power for powering the respective load.

In some examples, the one or more controllers may be configured to, in response to detection of the failure of the primary power source, control an islanding switch to disconnect the shared power line from the primary power source prior to an earliest one of the respective predetermined amounts of time.

In some examples, the inrush current limiting scheme may involve setting a firing angle applied to the respective switch to an initial value close to 180°, and gradually reducing the firing angle until the firing angle is 0°.

In some examples, the shared power line may be a medium voltage power bus, the first backup power supply may include a low voltage power supply, and the first transformer may be configured to interface the medium voltage power bus with the low voltage power supply.

DETAILED DESCRIPTION

Overview

Figure 1:
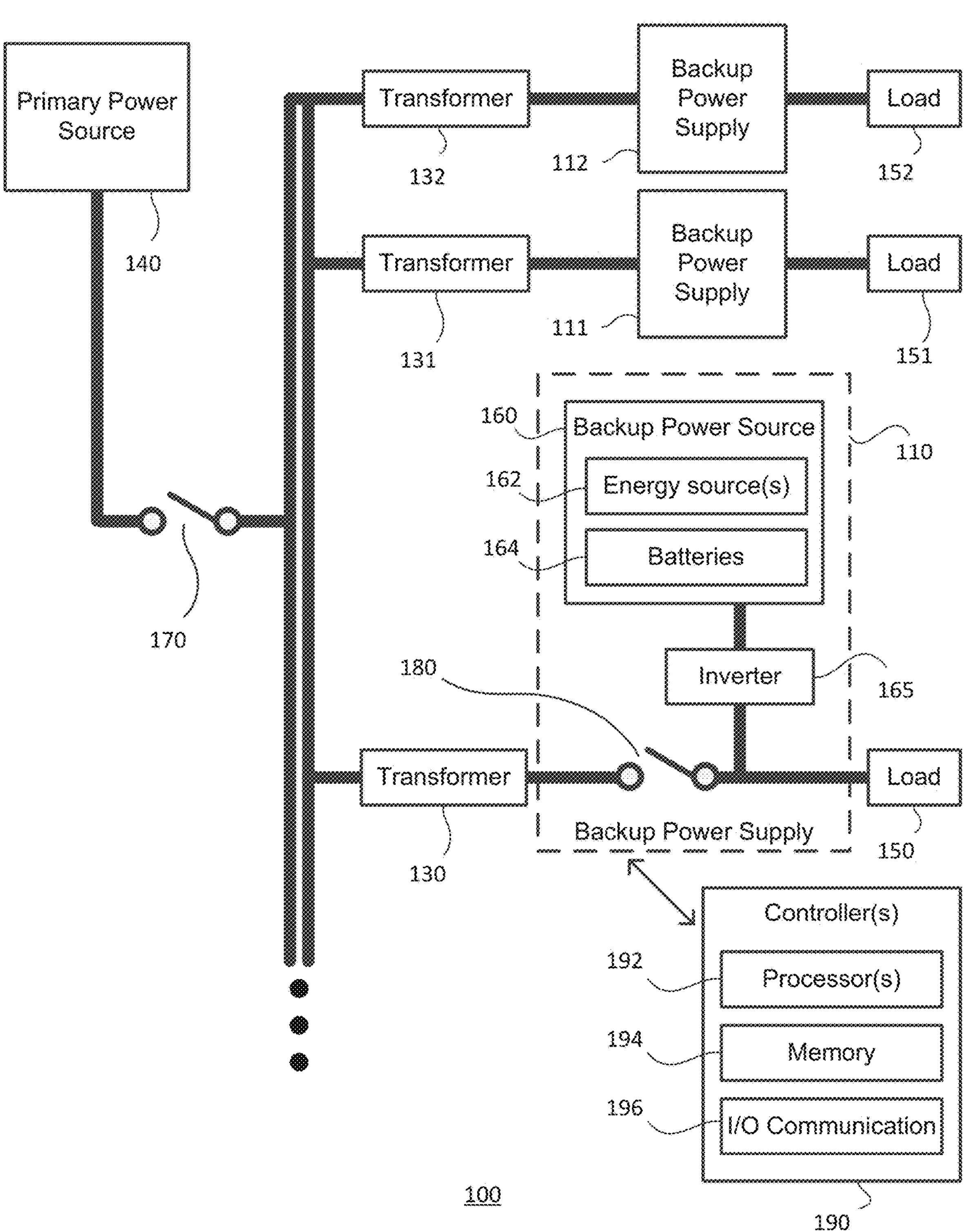
FIG. 1 is a block diagram of a system in accordance with an aspect of the disclosure.

In a backup power system, individual backup power sources are connected to respective loads and to a shared power line, such as a medium voltage power bus. The individual backup power sources are first connected to their respective loads immediately upon failure of the primary power source to ensure uninterrupted power supply at each load. Then, over a duration of time, the individual backup power sources are connected to the shared power line to facilitate power pooling among the loads. Connections to the shared power line may be performed in a staggered fashion to avoid overloading the power line with inrush current and to synchronize the backup power supplies with one another. The staggered connection of backup power supplies may be preprogrammed into the system.

When connecting at least a first backup power supply of a first voltage to the shared power line of a different second voltage, a transformer connecting the backup power supply and shared power line may be energized. For instance, the backup power supply may operate at low voltage whereas the shared power line may be a medium voltage bus. In such cases, energizing the transformer may be done gradually by opening and closing a switch between backup power supply and transformer according to a firing angle. The firing angle may be compared to a duty cycle of a pulse width modulator in which a half-cycle of the output of the backup power supply is equal to the period of the pulse width modulation signal, such that some energy from the power supply is transferred for each of the positive and negative phases of its cycle. The duty cycle may begin small, and gradually increase until the switch remains fully closed. For example, the firing angle may begin at its maximum in a half AC cycle and gradually decrease all the way to zero degrees.

The backup power supplies connected to the shared power line may include main backup power sources and auxiliary backup power sources. Typically, auxiliary backup power sources are smaller and much less expensive than the main backup sources, but have much shorter runtime. For example, the auxiliary backup power sources may include batteries, while the main backup power sources may include more expensive energy sources, such as fuel cells and other renewable resources. The use of auxiliary backup power sources for each load in the system avoids the need for the power rating of each main backup power source to equal to the maximum load demand of the corresponding load, since the auxiliary backup power sources can make up for any shortfall of the main backup power sources in the short term before connection of the main backup power sources over the shared power line, and power pooling can make up for the shortfall in the long term after connection of the main backup power sources over the shared power line. Furthermore, since each main backup power source does not need to meet the maximum load demand of its corresponding load, the main backup power sources can be made smaller than otherwise allowable. This can make the use of the main backup power sources more cost effective.

Example Systems

FIG. 1 is a block diagram of an example backup power system 100 including a plurality of backup power supplies 110, 111, 112 connected to a shared power line 120 through a plurality of respective transformers 130, 131, 132. The backup power system 100 may be connected to a primary power source 140, such as a utility grid, through the shared power line 120. Each backup power supply 110 may be positioned between the primary power source 140 and a respective load of a plurality of loads 150, 151, 152 powered by the backup power system 100.

In the example of FIG. 1, a single backup power supply 110 is shown in detail, although it should be understood that the single backup power supply 110 may be representative of the other backup power supplies 111, 112 of the backup power system 100. The backup power supply 110 may include a respective backup power source 160 configured to store energy for use to power the plurality of loads 150, 151, 152 in the event of a primary power source failure or disconnection. The backup power supply 110 may also include a respective inverter 165 configured to convert a flow of energy from the backup power source 160 from a direct current to an alternating current in order to power the plurality of loads 150, 151, 152. In effect, the backup power supplies 110, 111, 112 may collectively function as a microgrid for the plurality of loads 150, 151, 152 in the absence of power from the primary power source 140.

The backup power supply 110 is also switchably connectable to the shared power line 120 through a respective switch 180. In some examples, the switch 180 may be an intelligent static switch (ISS). In operation, when the primary power source 140 is connected to and powering the plurality of loads 150, 151, 152, the switch 180 may be closed. In some examples, such as the example of FIG. 1, closing the switch 180 may also connect the primary power source 140 to the backup power source 160 so that power from the primary power source 140 may be used to recharge the backup power source 160. Subsequently, in response to an event that causes the backup power supplies 110, 111, 112 to take over power supply responsibilities from the primary power source 140, such as a primary power source failure or disconnection, the switch 180 may be opened in order to initially isolate the backup power supply 110 from the other backup power supplies 111, 112. During isolation of the backup power supply 110, the backup power source 160 may still be connected to the corresponding load 150 of the backup power supply 110 and may be used to power the corresponding load 150. After isolation of the backup power supply 110, the switches 180 may subsequently be closed again to reconnect the backup power supply with the other backup power supplies 111, 112 over the shared power line 120, thereby causing the backup power supplies 110, 111, 112 to be pooled together. When the backup power supply 110 is pooled, its respective backup power source 160 may then provide power to all of the loads 150, 151, 152 of the reconnected backup power supplies 110, 111, 112.

In some examples, each backup power source 160 may include one or more main backup energy sources 162, which may be renewable energy sources such as hydrogen fuel cells, biofuel cells, other types of renewable fuel cells, solar cells, and so on. Renewable energy sources may be environmentally preferable over other energy sources such as diesel generators. Additionally or alternatively, each backup power source 160 may include one or more auxiliary energy sources 164, such as one or more batteries. The auxiliary energy sources 164 may be provided to supplement the main backup energy sources 162 of the backup power source 160, such that the backup power source 160 may have a first power rating while the auxiliary energy sources 164 are operating and a second power rating lower than the first power rating while the auxiliary energy sources 164 are not operating or have been fully or partially depleted.

The first and second power ratings may be selected based at least in part on the sizes of the respective loads 150, 151, 152 of the system 100. The first power rating may be individually selected for each respective backup power source 160 to be equal to the installed total maximum load. The second power rating may be collectively determined for all of the backup power sources based on a total maximum possible power consumption for the installed load. The over-subscription ratio may define a percentage difference between the first power rating and the second power rating.

For example, in a system having twenty separate loads having a maximum load rating of 600 kilowatts (KW), the maximum load of the system may be 12 megawatts (MW), but the power consumption of the installed may be much less than 12 MW, such as 9 MW. In one such example configuration, each of loads 1-8 may have a power consumption of 450 KW, each of loads 9-12 may have a power consumption of 400 kW, each of loads 13-16 may have a power consumption of 500 kW, each of loads 17-18 may have a load consumption of 350 KW, and each of loads 19-20 may have a power consumption of 550 KW, thereby totaling a total power consumption of 9 MW. In such a configuration, the backup power over-subscription ratio may be 33%, representing the percentage difference between the maximum possible load at 12 MW and the maximum power consumption of the loads at 9 MW, whereby 12 MW is 33% more than 9 MW. The batteries included in each backup power supply may be configured to contribute at least 150 KW—and up to 600 kW—of power for a relatively short duration, while the remaining energy sources of the backup power supply may be configured to contribute 450 kW of power for a relatively longer duration. As such, each individual backup power supply may have a first power rating of 600 kW to meet maximum load consumption demands over the short duration of time, and a second power rating of 450 kW to meet typical load consumption demands over the longer duration of time.

The short duration of time may correspond to a time that the backup power supply 110 is expected to operate in isolation from the other backup power supplies 111, 112 of the system 100. As such, for the short duration of time, the backup power supply 110 relies on the one or more auxiliary energy sources 164 to handle any power consumption demands of the corresponding load 150. The long duration of time may correspond to a time that the backup power supply 110 is expected to be connected to and operate in concert with the other backup power supplies 111, 112 of the system 100, such that power pooling techniques may instead be used for the backup power supply 110 to deliver the average load power.

The transformers 130, 131, 132 included in the system 100 may be provided to interface a shared power line and backup power supplies having different voltage levels. For instance, the backup power supplies 110, 111, 112 may operate at a relatively low voltage, whereas the shared power line may operate at a relatively higher voltage. This may be advantageous for mitigating current levels or avoiding excess current at the shared power line 140. For instance, in one implementation, the shared power line may be a medium-voltage (MV) power line having a voltage rating between about 10 kV to 35 kV, whereas the backup power supplies may be low-voltage (LV) power supplies having a voltage rating below 10 kV, in some cases below 1 kV, and in some cases 480 V or lower. In such an implementation, each transformer 130, 131, 132 may be an MV/LV transformer.

In the example of FIG. 1, the system 100 is further shown to include an islanding switch 170 positioned between the shared power line 120 and the primary power source 140. In operation, in response to an event that causes the backup power supplies 110, 111, 112 to take over power supply responsibilities from the primary power source 140, the islanding switch 170 may disconnect the primary power source 140 from the backup power system 100 to avoid power being fed back from the system 100 to the primary power source 140. Disconnection of the primary power source 140 may occur after or at the same time as opening the switch 180.

Operations of the components of the backup power supplies 110, 111, 112 as well as the islanding switch 170 may be controlled by one or more controllers included in the system 100. In the example of FIG. 1, for the sake of simplicity, a single controller 190 shared by the backup power supplies 110, 111, 112 and other system components is shown. However, it should be appreciated that each component and each backup power supply may include its own respective controller, and further that the respective controllers may or may not be capable of communication with one another. The controller 190 may include one or more processors 192 and memory 194. The memory 194 may include one or more storage devices, such as a non-transitory computer-readable storage medium which may store programs, modules and data structures, or any subset thereof. The one or more processors 192 may be configured to access data stored in the memory 194 and to execute instructions according to one or more programs stored therein or in an external device accessed through one or more input/output components 196. For example, the one or more processors 192 may be capable of executing any of the example routines described in the present disclosure.

In one example implementation of the system 100 of FIG. 1, the plurality of loads 150, 151, 152 may be one or more power-consuming components of a data center. For example, each load may include any one or combination of servers and computing devices, cooling equipment, power distribution equipment, lighting equipment, as well as other power-consuming equipment that may be housed within the data center building. Furthermore, each backup power supply 110, 111, 112 may be a respective uninterruptable power supply (UPS) included in the data center. The UPS may be operated at a low-voltage rating such as 120V, 208 V or 480 V, whereas the shared power line may be a power bus operating at a medium-voltage rating such as 10 kV, 15 kV or 25 kV.

Example Methods

Figure 2:
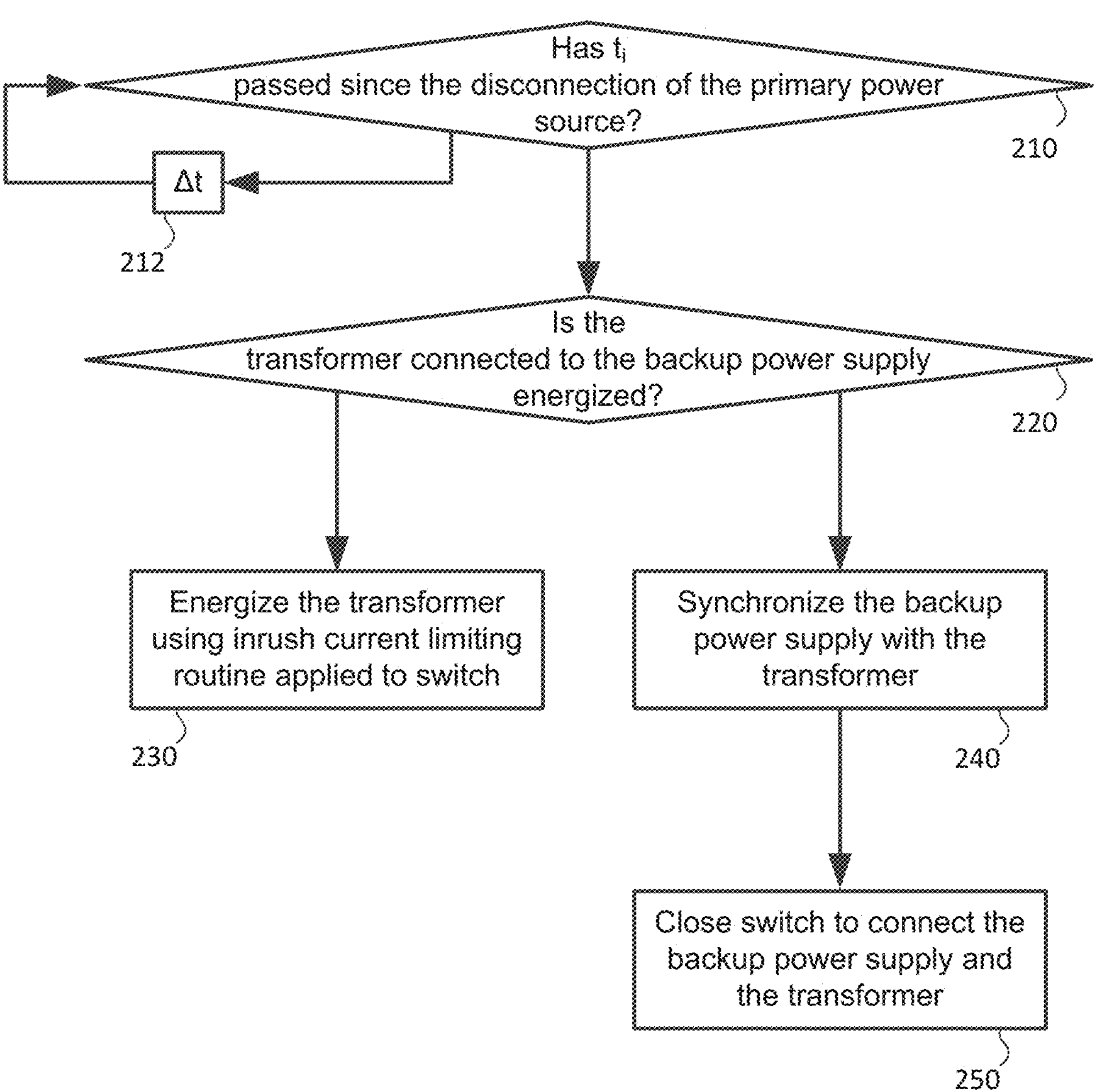
FIG. 2 is a flow diagram illustrating a routine in accordance with an aspect of the disclosure.

FIG. 2 is a flow diagram illustrating an example routine 200 that may be executed by an $i^{th}$ backup power supply from among a plurality of backup power supplies, such as any one of the backup power supplies 110, 111, 112 of the example system 100 of FIG. 1. The routine 200 may be executed by a controller, such as controller 190 shown in the example system 100 of FIG. 1, or another processing unit in communication with the backup power supply, in response to disconnection of a primary power source from the system to which the backup power is to be supplied.

The routine begins at block 210 with a determination of whether a predetermined amount of time $t_i$ has passed since the disconnection of the primary power source from the system. If the predetermined amount of time has not passed, operations may continue at block 212 with a time delay Δt, and then after the time delay, operations may return to block 210. If the predetermined amount of time $t_i$ has passed, operations may continue at block 220. In effect, the routine may ensure that the operations of block 220 and onward are not executed until after the passage of the predetermined amount of time $t_i$.

At block 220, it may be determined whether the transformer connecting the backup power supply to the shared power line is energized, such as by power transfer from another backup power supply included in the system. If the transformer is not energized, then operations may continue at block 230 with energizing of the transformer. Energization of the transformer may be a gradual process in order to limit inrush current from the backup power supply. An inrush current limiting routine may involve gradually increasing a duty cycle of a signal to close the switch between the backup power source and the transformer so that the power transferred from the backup power source to the transformer is slowly and gradually increased.

Figure 3A:
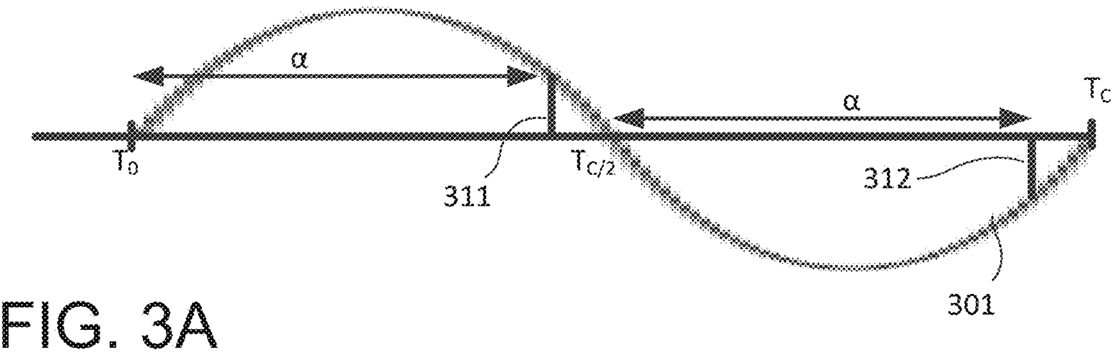
FIGS. 3A-3C are illustrations of transformer voltage over time in accordance with an aspect of the disclosure.
Figure 3B:
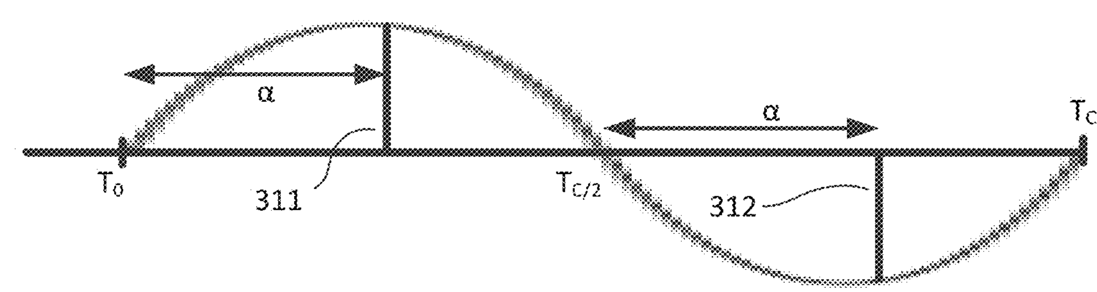
Figure 3C:
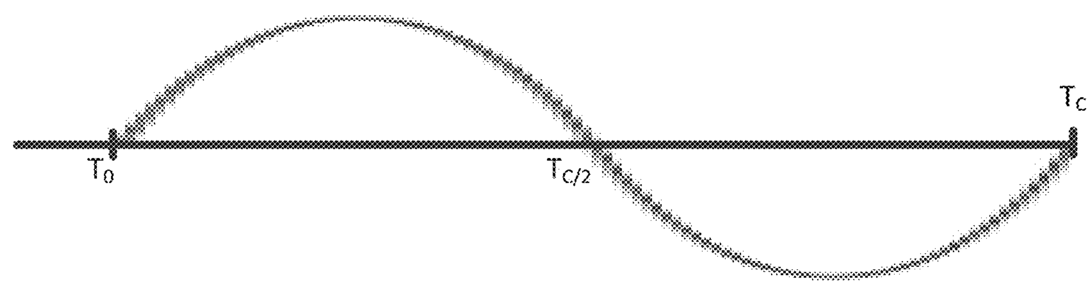

FIGS. 3A-3C illustrate sample snapshots of switch operation over time for gradually increasing the power transferred from the backup power source to the transformer. Each of FIGS. 3A-3C shows a respective cycle of alternating current output by the backup power supply from a start time of the cycle $T_0$ to a completion time of the cycle $T_C$. In the example of FIGS. 3A-3C, each cycle is shown as a sine wave, although other waveforms may be used. Also, in the example of FIGS. 3A-3C, a positive voltage is output during a first half of each cycle from $T_0$ until $T_{C/2}$, and a negative voltage is output during a second half of each cycle from $T_{C/2}$ until $T_C$, although in other examples, an order of the respective half-cycles may be reversed.

In each example snapshot, a pair of vertical lines 311, 312 are provided to illustrate a time that the switch connecting the backup power supply and the transformer is closed, thereby allowing energy to pass from the backup power supply to the transformer. Additionally, in each example snapshot, the switch is opened at the end of each half-cycle, thereby cutting off the energy transfer. The time at which the switch is closed is commonly referred to as the turning-on angle or firing angle α, whereby a firing angle of 180° represents closing of the switch at the end of each half-cycle and thus no power transfer and no energization of the transformer, and whereby a firing angle of 0° represents closing of the switch at the beginning of each half-cycle and thus a complete power transfer and full energization of the transformer. Until the firing angle is transitioned to 0°, only a portion of the alternating current output by the backup power supply is passed through the switch and received at the transformer. In the examples of FIGS. 3A-3C, the waveform passed through the switch is shown as a bold line 301.

In the energization operations of block 230, the firing angle α is gradually transitioned from close to 180° to 0°.

FIG. 3A is a snapshot of an alternating current cycle at a beginning of the energization operations of block 230, which begins by applying a firing angle close to 180° to the switch. For each alternating current cycle output by the backup power source, the switch is closed for only a tail end of each half-cycle, meaning that only the power output at the respective tail-ends of the alternating current half-cycles are passed from the backup power source through the switch and to the transformer. This effectively limits the current received at the transformer at the initial time shown in FIG. 3A.

FIG. 3B is a snapshot of an alternating current cycle at about a middle of the energization operations of block 230, by which time the firing angle has been reduced to about 100°. At this time, for each alternating current cycle output by the backup power source, the switch is closed for nearly half of each half-cycle, meaning that nearly half of the power output by the backup power source is passed through the switch and to the transformer. This effectively maintains some limit on the current received at the transformer, such it is not as limited as at the initial time.

FIG. 3C is a snapshot of an alternating current cycle at the end of the energization operations of block 230, by which time the firing angle has been reduced all the way to 0°. At this time, the full alternating current cycle output by the backup power source is passed through the switch and to the transformer. Effectively, there is no more limit on the current received at the transformer, and the transformer may be fully energized. Thus, transformer inrush current is limited by gradually increasing the voltage across the transformer in accordance with the decreasing of the firing angle The duration of the energization operations of block 230, which is also the amount of time between the snapshot of FIG. 3A and that of FIG. 3C, may be predetermined and preprogrammed into the routine 200. For instance, in some applications, a duration of between several milliseconds to 1 second may be used, although the duration could be even more than 1 second.

Returning to FIG. 2, if it is determined at block 220 that the transformer connecting the backup power supply to the shared power line is already energized, then operations may continue at block 240 with synchronization of the backup power supply with the transformer. The synchronization operations may be executed using any conventional synchronization techniques or system known in the art, such as using a load bus synchronization (LBS) system. Subsequently, at block 250, when the backup power supply and transformer are synchronized, the switch may be closed to connect the backup power supply and transformer. Once the switch is closed, the inverter of the backup power supply may be controlled such that power from the backup power supply is almost equally shared among the backup power supply and any other backup power supply that is reconnected to the shared power line. Power sharing among of the backup power supplies may be controlled using a known power sharing control technique, such as droop control.

The predetermined amount of time $t_i$ after which the operations of block 220 and onward are executed may be preprogrammed into the routine 200. Furthermore, the predetermined amount of time $t_i$ may be different for each of the plurality of backup power supplies, such that the operations of the routine 200 from block 220 and onward may be executed for each backup power supply at a different time. For instance, cascading time delays may be assigned to each backup power supply so that each backup power supply is connected to the shared power line at a separate time. The amount of amount of time separating connection of each backup power supply may be predetermined, and may vary depending on the particular requirements and configurations of a given system. Generally, for a system including N backup power supplies and for which the auxiliary energy sources of the backup power supplies are expected to deliver supplementary power for a limited timeframe of X minutes, the amount of time separating connection of each backup power supply should not exceed X/N seconds, although less time may also be acceptable. In some systems, the time delay may be on the order of about 10 seconds.

Figure 4:
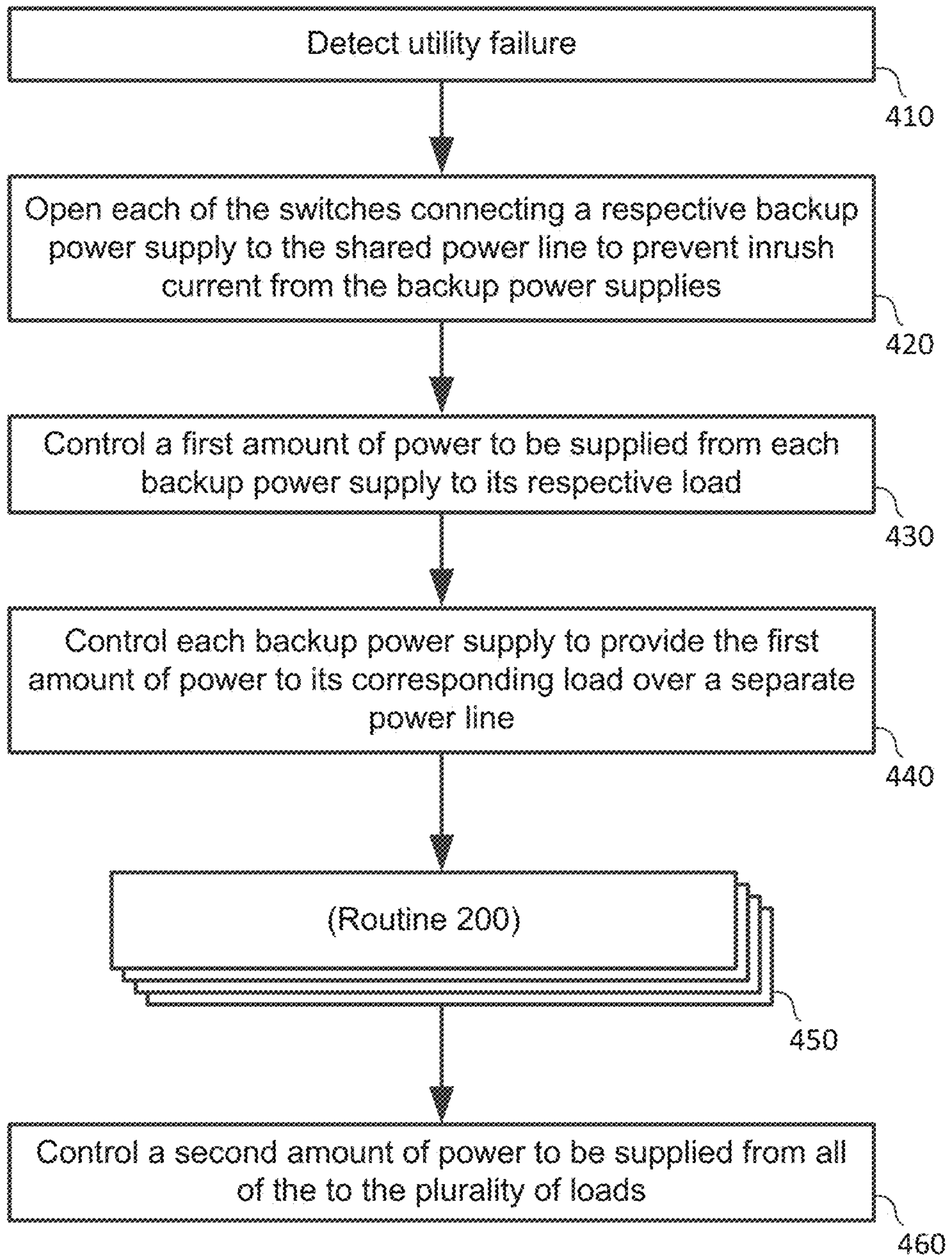
FIG. 4 is a flow diagram illustrating another routine in accordance with an aspect of the disclosure.

FIG. 4 is a flow diagram illustrating an example routine 400 that may be executed by system including a plurality of backup power supplies, such as the example system 100 of FIG. 1. The routine 400 may begin with a utility failure, such as disconnection of the primary power source from the system. At block 410, the utility failure is detected 410. The detection may be performed by one or more sensors included in the system, such as one or more voltage sensors, one or more current sensors, other types of power failure sensors known in the art, or a combination thereof.

At block 420, in response to detection of the utility failure, one or more system controllers may control the switches connected to the shared power line. Controlling the switches may involve opening each of the switches connecting a respective backup power supply to the shared power line so that each backup power supply independently provides power to its respective load. In some examples, controlling the switches may further involve opening an islanding switch connected between the shared power line and the primary power source in order to prevent power from being fed back from the system to the primary power source.

At block 430, the one or more system controllers may control a first amount of power to be supplied from each backup power supply to its respective load. The first amount of power may meet a first power rating for maximum load consumption demands of the respective load. Supplying the first amount of power may involve utilizing a combination of long-term power sources and short-term power sources. A long-term power source may be a renewable power source, such as a fuel cell, whereas a short-term power source may be a battery. The fuel cell may be capable of providing power at a second power rating that is lower than the first power rating for a relatively long amount of time, such as an amount of time for which the utility failure is expected to last or longer if the power source can be refueled during the utility failure. In some examples, the amount of time may be about 24 hours, about 48 hours, about 72 hours, or another amount of time. The battery may be capable of increasing the power rating for a relatively short amount of time, such as an amount of time for which the routine of 400 is expected to last. In some examples, the amount of time may be about 20 minutes, about 30 minutes, about an hour, or another amount of time.

At block 440, also in response to detection of the utility failure, the one or more system controllers may control each backup power supply to provide the first amount of power to its corresponding load over a separate power line that is disconnected from the shared power line. Providing power from each backup power supply may involve turning on an inverter at the backup power supply to convert a direct current of the backup power source to an alternating current that can be used to power the corresponding load. The invertors may be turned on at about the same time as the switches are opened, either before the switches are opened and sufficiently close in time to opening the switches so as to avoid inrush current at the shared power line, or after the switches are opened and sufficiently close in time to the utility failure to avoid power supply interruption at the plurality of loads. In some examples, the backup power supply switches may be turned off and inverter switches turned on at approximately a first time, and the islanding switch may be turned off at a second time that is later than the first time.

At block 450, operations may continue at each of the backup power supplies with the operations of routine 200 of FIG. 2. This may involve waiting for passage of a certain amount of time, such as 10 seconds, followed by determining whether the transformer connecting the backup power supply to the shared power line is energized, and then either energizing the transformer before closing the switch if the transformer is not energized, or synchronizing the backup power supply with the transformer before closing the switch if the transformer is already energized.

For example, for a first backup power supply programmed to wait for the shortest passage of time, it is certain that the transformer will be determined not to be energized. If the first backup power supply succeeds in energizing the transformer, connecting to the shared power line, and providing power to the shared power line, then this success should result in the other transformers connected to the shared power line also being energized. In such a case, each of the other backup power supplies may be able to skip the gradual increase of backup power fed to the transformer. However, since the transformer is already energized and has its own phase independent of the backup power source, the backup power source will need to be synchronized with the transformer before closing the switch and electrically connecting the backup power supply to the transformer.

Upon completion of the operations of block 450, each of the backup power supplies should be properly connected to the shared power line of the system and synchronized with one another, making power sharing possible between the loads. At block 460, in response to the completion of the operations of block 450 or in response to passage of an amount of time that is longer than the longest predetermined amount of time $t_i$ programmed for the backup power supplies, the one or more system controllers may control a second amount of power to be supplied from all of the backup power supplies to the plurality of loads. The second amount of power may be at the second power rating that is lower than the first power rating, and may involve oversubscribing the power of the main backup power source after power pooling on the shared power line. The auxiliary backup power source may continue to be used as needed after connection of the backup power supplies through the shared power line, such as to deliver enough power for a brief amount of time, such as during load transient events.

Figure 5:
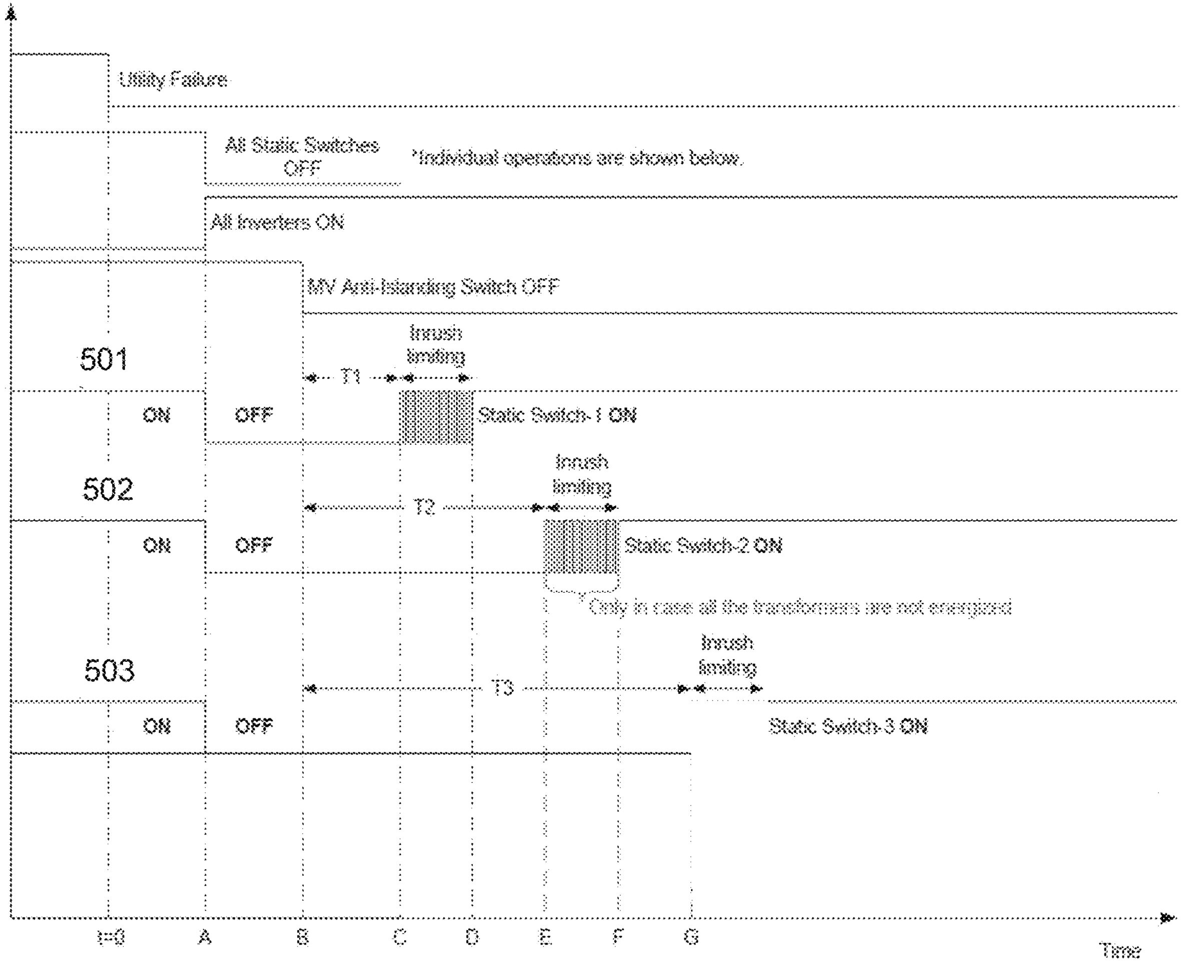
FIG. 5 is an example switch control timing sequence for the routine of FIG. 4.

FIG. 5 is a chart illustrating a timing sequence 500 for switches of a microgrid. In the example of FIG. 5, only three backup power supplies of the microgrid are shown, but it should be understood that the microgrid may contain more or fewer backup power supplies.

As shown in FIG. 5, at time t=0, a utility failure occurs. In response, at time t=A, each of the switches connecting the backup power supplies to the shared power line are opened, thereby disconnecting the backup power supplies from the shared power line. Also at time t=A, all inverters connected to the backup power supplies are turned on to provide power from the backup power supplies to the respective loads of the microgrid. At time t=B, the islanding switch is switched off.

In the example of FIG. 5, the first backup power supply 501 is programmed to begin the routine 200 of FIG. 2 after duration T1 at time t=C, the second backup power supply 502 is programmed to begin the routine 200 after duration T2 at time t=E, and the third backup power supply 503 is programmed to begin the routine 200 at time t=G. Between time t=C and time t=D, the switch connecting the first backup power supply 501 to its respective transformer is opened and closed according to a firing angle that is gradually transitioned from close to 180° at time t=C to 0° at time t=D. At time t=D, the transformer is expected to be fully energized and in phase with the first backup power supply 501 and the switch remains closed. Since the switch is fully closed, power may be provided from the first backup power supply 501 to the shared power line and to the transformers of the other backup power supplies 502, 503.

At a time between t=D and t=E, it is determined whether or not the transformer connected to the second backup power supply 502 is fully energized. In the example of FIG. 5, it is determined that the transformer is not energized, possibly due to a failure at the first backup power supply 501, the transformer connected to the first backup power supply 501, or the connection in between. In response to this determination, beginning at time t=E and ending at time t=F, the switch connecting the second backup power supply 502 to its respective transformer is opened and closed according to a firing angle that is gradually transitioned from close to 180° at time t=E to 0° at time t=F. At time t=F, the transformer is fully energized and in phase with the second backup power supply 502 and the switch remains closed. Since the switch is fully closed, power may be provided from the second backup power supply 502 to the shared power line and to the transformers of the other backup power supplies 501, 503.

At a time between t=F and t=G, it is determined whether or not the transformer connected to the third backup power supply 503 is fully energized. In the example of FIG. 5, it is determined that the transformer is energized. In response to this determination, at a time before t=G, the third backup power supply is in phase with the transformer. Synchronization in this example and the other examples of the disclosure may involve bringing the backup power supply and transformer in phase with one another. Finally, at time t=G, the switch between the transformer and the third backup power supply 503 is closed. Thus, at time t=G, each of the backup power supplies may be connected to the shared power line and power may be shared among the supplies to power the plurality of loads connected to the microgrid.

The examples of the present disclosure may be useful for forming a power pool on a medium voltage bus. In particular, the system of the present disclosure enables microgrids to rely on batteries for excess power demands on a short term basis while slowly pooling the main backup power sources to oversubscribe the power on a long term basis. This may be beneficial for saving capital expenditure (CapEx) for expensive backup power sources such as renewable resources like fuel cells, since the power sources can be integrated according to a lower second power rating instead of having to meet the demands of a higher first power rating. Additionally, by making the use of renewable power sources more cost effective, the systems and techniques of the present disclosure also encourage the use of these renewable resources, thereby encouraging the production of more environmentally friendly microgrids such as data centers.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A backup power supply comprising:

one or more main backup energy sources configured to supply first backup power to a plurality of loads, wherein at least a portion of the plurality of loads are switchably electrically connectable to the backup power supply over a first electrical path; and one or more auxiliary energy sources configured to supply second backup power to a respective load of the backup power supply over a second electrical path separate from the first electrical path.

2. The backup power supply of claim 1, wherein the plurality of loads further includes the respective load of the backup power supply.

3. The backup power supply of claim 1, wherein the first electrical path is a medium-voltage power line, and wherein the second electrical path is a low-voltage power line.

4. The backup power supply of claim 1, wherein the one or more main backup energy sources are renewable energy resources.

5. The backup power supply of claim 1, wherein the backup power supply is configured to:

operate at a first power rating for a first duration of time using the one or more main backup energy sources and the one or more auxiliary energy sources; and operate at a second power rating for a second duration of time subsequent to the first duration of time using only the one or more main backup energy sources.

6. The backup power supply of claim 5, wherein the first duration of time is shorter than the second duration of time.

7. The backup power supply of claim 1, wherein the backup power supply includes a switch connected to a transformer on the first electrical path, and wherein the switch is configured to control an amount of electrical power supplied from the one or more main backup energy sources to the transformer.

8. The backup power supply of claim 7, wherein the switch is an intelligent static switch (ISS).

9. The backup power supply of claim 7, wherein the backup power supply is configured to, in response to detection of a primary power source failure:

open the switch; and supply the first and second backup power to the respective load.

10. The backup power supply of claim 9, wherein the backup power supply is configured to control the amount of electrical power supplied from the one or more main backup energy sources to the transformer after supplying the first and second backup power to the respective load.

11. The backup power supply of claim 10, wherein the backup power supply is configured to control the amount of electrical power supplied from the one or more main backup energy sources to the transformer by repeatedly closing and opening the switch over a plurality of switch cycles, and by gradually increasing an amount of time for which the switch is closed for each switch cycle.

12. The backup power supply of claim 11, wherein the backup power supply is configured to gradually increase the amount of time for which the switch is closed until the switch remains fully open.

13. The backup power supply of claim 11, wherein the backup power supply is configured to, after controlling the amount of electrical power supplied from the one or more main backup energy sources to the transformer for a predetermined amount of time over which the transformer is fully energized, reconnecting the transformer to the first electrical path.

14. The backup power supply of claim 1, wherein the one or more auxiliary energy sources includes a battery.

15. The backup power supply of claim 1, wherein the one or more main backup energy sources are configured to supply first backup power to the plurality of loads over the first electrical path in response to an event that causes the backup power supply to take over power supply responsibilities from a primary power source.

16. The backup power supply of claim 1, wherein the plurality of loads includes:

a first load connected to the one or more main backup energy sources and the one or more auxiliary energy sources of the backup power supply over the second electrical path; and one or more second loads switchably connected to the one or more main backup energy sources of the backup power supply over the first electrical path.

17. The backup power supply of claim 16, further comprising a switch, wherein at least the portion of the plurality of loads are switchably electrically connectable to the backup power supply over the first electrical path through the switch, and wherein the second electrical path is separated from the first electrical path by the switch.

18. A method for supplying backup power, comprising:

supplying, by one or more main backup energy sources, a first backup power to a plurality of loads, wherein the plurality of loads are switchably electrically connectable to the one or more main backup energy sources over a first electrical path;

detecting, by a controller, failure of a primary power source; and in response to the detected failure, controlling, by the controller, the one or more main backup energy sources of a respective load of the plurality of loads and one or more auxiliary energy sources to supply the first backup power and a second backup power, respectively, to the respective load over a second electrical path separate from the first electrical path.

19. The method of claim 18, further comprising:

operating at a first power rating for a first duration of time using the one or more main backup energy sources and the one or more auxiliary energy sources; and operating at a second power rating for a second duration of time subsequent to the first duration of time using only the one or more main backup energy sources.

20. The method of claim 19, wherein the first duration of time is shorter than the second duration of time.

21. The method of claim 18, wherein controlling the supply of the first and second backup power to the respective load comprises controlling, by the controller, an amount of electrical power supplied from the one or more main backup energy sources to a transformer connecting the one or more main backup energy sources to the first electrical path.

22. The method of claim 21, wherein controlling the amount of electrical power supplied from the one or more main backup energy sources to the transformer comprises repeatedly closing and opening a switch over a plurality of switch cycles, and gradually increasing an amount of time for which the switch is closed for each switch cycle.

23. The method of claim 22, wherein gradually increasing the amount of time for which the switch is closed continues until the switch remains fully open, the method further comprising, after supplying the amount of electrical power from the one or more main backup energy sources to the transformer for a predetermined amount of time over which the transformer is fully energized, reconnecting the transformer to the first electrical path.

* * * * *